United States Patent [19]

Chen

[11] Patent Number: 5,061,124
[45] Date of Patent: Oct. 29, 1991

[54] DRILLING MACHINE

[76] Inventor: Chao-Yang Chen, No. 585, San-Feng Road, Fengyuan City, Taiwan

[21] Appl. No.: 558,648

[22] Filed: Jul. 27, 1990

[51] Int. Cl.$^5$ .......................... B23B 47/26; B23B 47/16
[52] U.S. Cl. ..................................... 408/135; 408/128; 474/39; 474/42
[58] Field of Search ............... 144/1 C; 408/128, 135, 408/129, 99, 100, 110–112, 712; 474/11, 12, 17, 19, 20, 37, 39, 40, 42

[56] References Cited

U.S. PATENT DOCUMENTS

| 814,247 | 3/1906 | Strong | 408/99 |
|---|---|---|---|
| 2,720,186 | 10/1955 | Springer | 474/42 X |
| 3,491,608 | 1/1970 | Trofimov | 474/39 |
| 3,718,405 | 2/1973 | Keiter et al. | 408/128 |
| 4,468,159 | 8/1974 | Oster | 408/112 X |

FOREIGN PATENT DOCUMENTS

| 2701358 | 7/1978 | Fed. Rep. of Germany | 408/99 |
|---|---|---|---|
| 754552 | 11/1933 | France | 408/99 |

*Primary Examiner*—Steven C. Bishop
*Attorney, Agent, or Firm*—Woodcock Washburn Kurtz Mackiewicz & Norris

[57] ABSTRACT

A top housing supported by a vertical post in a drilling machine is provided with a belt transmission mechanism incorporating a speed adjusting mechanism which can be operated easily and manually. The adjusting mechanism includes a knob connected to an adjusting rod which in turn is connected to a movable cone-shaped disk. The adjusting rod has a helical thread engaging with a projection of a fixed annular seat through which the adjusting rod passes. The adjusting rod is moved axially when rotated and moves the movable cone-shaped disk with respect to a fixed cone-shaped disk. A locking nut is threadedly sleeved around the annular seat to prevent the adjusting rod from rotation when the nut is tightened. The top housing is mounted movably on the vertical post and normally moved upward by a compression spring. A rack-and-pinion mechanism is associated with the top housing and the vertical post so that the top housing can be moved downward by operating a handle which is connected to the rack-and-pinion mechanism.

5 Claims, 4 Drawing Sheets

DRILLING MACHINE

BACKGROUND OF THE INVENTION

This invention relates to a drilling machine and particularly to a variable speed transmission mechanism and a feeding mechanism for a drilling member of a drilling machine.

FIG. 1 shows a conventional drilling machine which includes a vertical post 2 mounted on a base 1 and a top housing 3 mounted on the post 2. To the lower side of the housing 3 is mounted a drilling member 4. A motor 5 is mounted in the housing 3 with a driving pulley 5a on its shaft. The driving pulley 5a is connected to a driven pulley 4a through a transmission belt 6 so that the output rotation of the motor is transmitted to the drilling member 4. The pulleys used in this machine are step pulleys so that the speed of the transmission belt is adjustable. However, when it is desired to change the speed of the drilling member 4 it is necessary to change the position of the belt 6 by detaching the belt from one of the grooves of a step pulley and then placing it in an other groove. This adjustment is inconvenient. The drilling member 4 is connected to a splined shaft (not shown) which is associated with a splined sleeve member so that the drilling member 4 can be moved downward or upward while rotating. The drilling member 4 is also provided with a rack which is associated with a pinion 7a. The pinion 7a is mounted on an operating shaft which is connected to an operating handle 7. By operating the handle 7, the drilling member can be fed from the machine or withdrawn from a workpiece. In this machine, the transmission mechanism required to rotate the drilling member while allowing the drilling member to move up and down is complicated and also expensive because of the use of the splined shaft and the splined sleeve.

SUMMARY OF THE INVENTION

An object of the invention is to provide a drilling machine with a variable speed transmission mechanism whose speed can be adjusted conveniently.

Another object of the invention is to provide a drilling machine with a feeding mechanism which is independent of the transmission mechanism so that the machine can use a simplified construction which does not employ a splined shaft and a splined sleeve.

According to the present invention, a drilling machine which includes a vertical support holding a top housing and a worktable below the top housing and a drilling member mounted on the top housing is characterized is that the top housing is mounted movably on the vertical post to move upward or downward, the vertical post has a compression spring to urge the top housing upward; a feeding mechanism for the drilling member includes a rack member mounted on the vertical post, a horizontal operating shaft mounted in the top housing adjacent the rack member, a pinion mounted on the horizontal operating shaft and engaging the rack member, an operating handle connected to the operating shaft so as to rotate the pinion. In this drilling machine, the drilling member is fed when the top housing is moved downward by operating the handle.

In one aspect of the invention, the vertical post is hollow and encases a vertical fixed guide rod. The top housing has a hollow receiving a top portion of the vertical post. The top housing further has a bearing part above the vertical post, said bearing part having an opening to permit the vertical fixed guide rod to pass therethrough. The compression spring is disposed in the vertical post around the vertical rod, and has a bottom end fixed to the vertical post and a top end connected to the bearing part.

In still another aspect of the invention, the drilling machine is further characterized by: a variable speed driving pulley assembly having a first fixed cone-shaped disk and a first movable cone-shaped disk mounted on a driving shaft; a variable speed driven pulley assembly having a second fixed cone-shaped disk and a second movable cone-shaped disk mounted on a driven shaft; a belt interconnecting the driving and driven pulley assemblies; an adjusting rod mounted rotatably in the top housing and aligned coaxially with the driven shaft, the adjusting rod having a first end rotatably connected to a center portion of the second movable cone-shaped disk, a second end extending out of the top housing and having a peripheral helical thread between the first and second ends; a knob attached to the second end of the adjusting rod; an annular seat mounted on and extending out from the top housing, the annular seat having a through-hole to permit the adjusting rod to pass therethrough and a projection means engaging the peripheral helical thread so that the adjusting rod moves axially when being rotated; and means for preventing the adjusting rod from rotation, provided adjacent the knob.

In still another aspect of the invention, the annular seat has an annular wall, two through-holes provided in the annular wall at diametrically opposite positions, the projection means having two balls movably received in the through-holes and projecting inward and outward of the annular wall.

In still another aspect of the invention, the annular seat further has an external screw thread on the annular wall, the preventing means includes a locking nut disposed around the annular seat, the locking nut having an internal screw thread adjacent to an outer end of the annular seat and engaging the external screw thread of the annular wall, an annular groove which is opened at an inner end of the annular seat and receives portions of the balls projecting from the annular wall, and an annular shoulder formed between the internal screw thread and the annular groove, the annular shoulder being slightly tapered from the annular groove to the internal screw thread. The balls tightly engage with the helical thread and the tapered annular shoulder when the locking nut is tightened and prevent rotation of the adjusting rod.

The exemplary preferred embodiment will be described in detail with reference to the accompanying drawings, in which:

DETAILED DESCRIPTION OF THE PREFERRED EMBODIMENT

Figure 1:
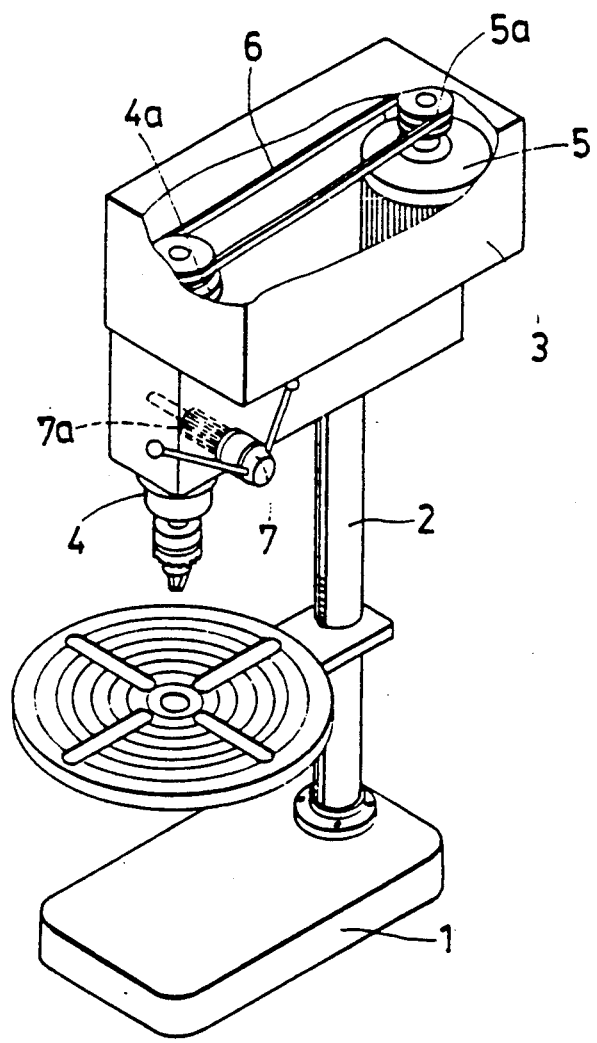
FIG. 1 is a perspective view of a drilling machine of the prior art.
Figure 2:
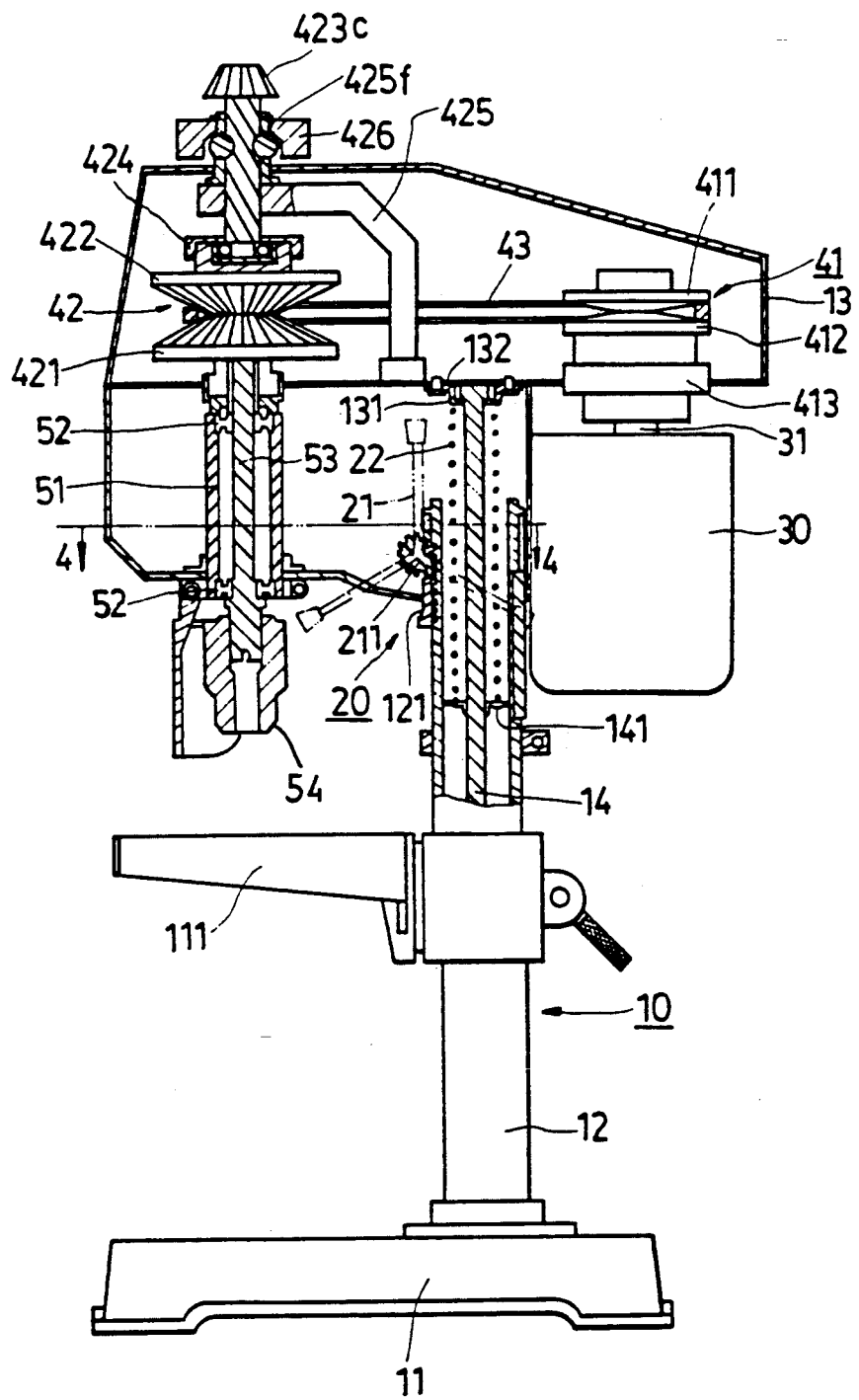
FIG. 2 is a partially sectioned elevation view of a drilling machine embodying the present invention.
Figure 3:
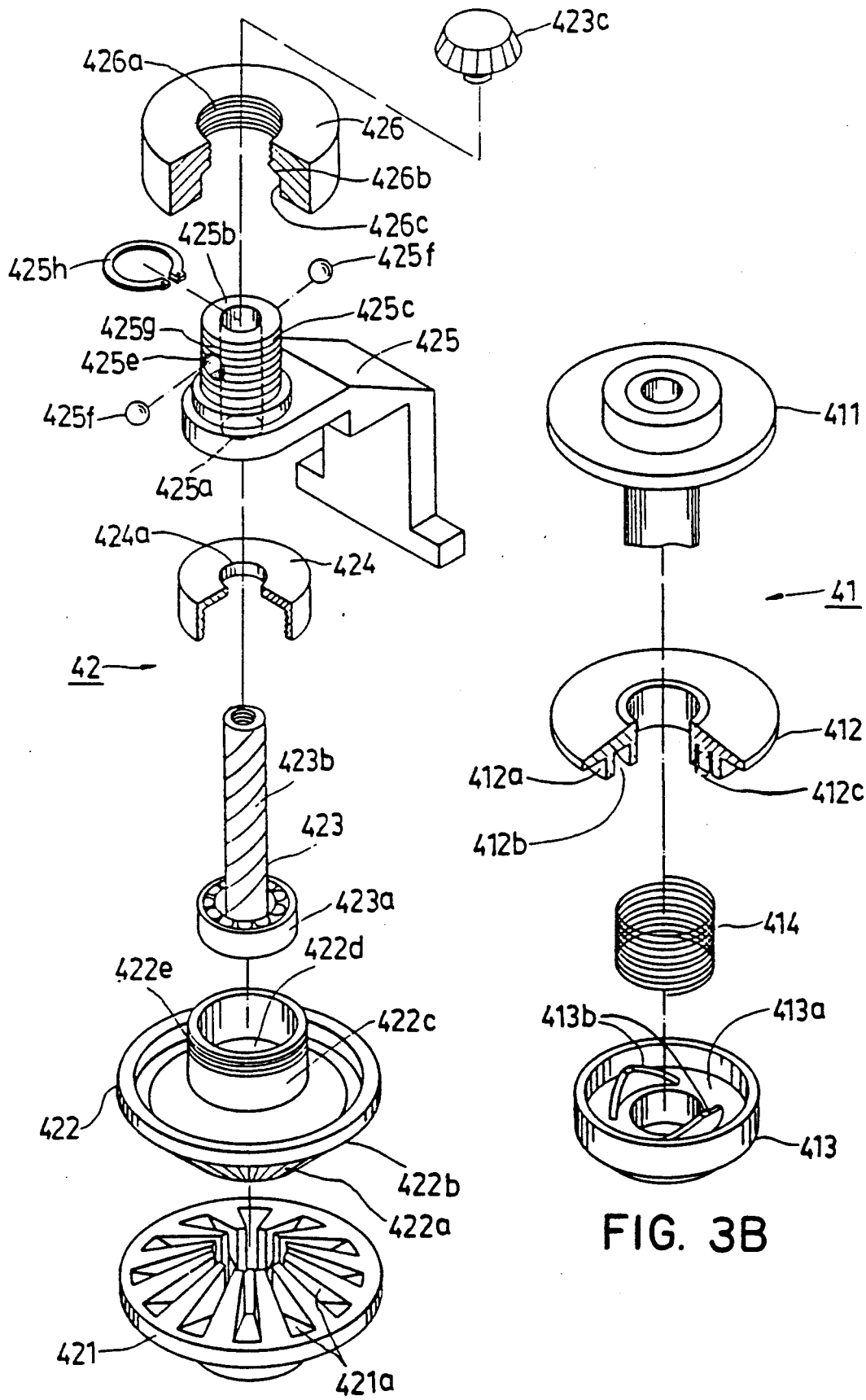
FIG. 3a and 3b shows an exploded view of the transmission mechanism of the drilling machine of FIG. 2.

Referring to FIGS. 2, 3a, and 3b, the embodiment of the invention includes a machine body 10, a feeding mechanism 20, a motor 30, a transmission mechanism 41 and 42, and a drilling member 54.

The machine body 10 includes a vertical post 12 mounted on a base 11, a top housing 13 mounted movably on the post 12, and a worktable 111 fixed to the post 12. The post 12 is hollow and encases a fixed vertical guide rod 14. Both the post 12 and the vertical guide rod 14 extend into the top housing 13. The top end of the vertical guide rod 14 extends through a bearing plate 132 of the housing 13. A spring 22 is disposed around the guide rod 14. One end of the spring 22 is connected to a bearing plate 141 of the post 12 and another end of the spring 22 is connected to a bearing member 131 attached to the bearing plate 132, thereby resiliently supporting the housing 13.

Figure 4:
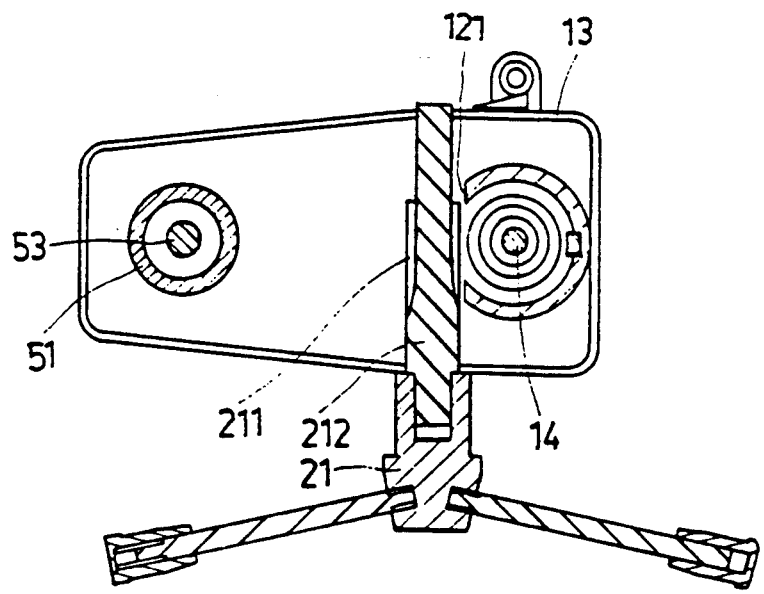
FIG. 4 is a sectional view taken along line 4—4 of the drilling machine of FIG. 2.

Referring to FIGS. 2 and 4, the feeding mechanism 20 includes a vertical rack member 121 which is fixed to an upper portion of the post 12. A horizontal operating shaft 212 is mounted fixedly in the top housing adjacent the rack member 121. A handle 21 is attached to one end of the shaft 212 which extends out of the top housing 13. A pinion 211 is mounted on the operating shaft 212 and is engaged with the rack member 121. When the handle is turned, the pinion 211 is rotated and -moved along the rack member 121. The action of the pinion 211 and the rack member 121 moves the top housing downward against the action of the spring 22 thereby feeding the drilling member 54 to the workpiece.

A motor 30 is mounted on the top housing 13 adjacent to the post 12. The transmission mechanism includes two variablele-speed pulley assemblies 41 and 42. The pulley assembly 41 includes a first cone-shaped disk 411 fixed to the shaft 31 of the motor 30 and a second cone-shaped disk 412 mounted movably on the shaft 31. The cone-shaped sides of the disks 411 and 412 are facing one another. The second cone-shaped disk 412 has an annular guide member 412a which has an annular groove 412b and two projections 412c formed at two diametrically opposite positions in the groove 412b. An annular cap member 413 is mounted fixedly on the shaft 31 adjacent the second cone-shaped disk 412. The cap member 413 is provided with two projections 413b which extend into the groove 412b. The projections 413b will push the projections 412c of the disk 412 and cause the disk 412 to rotate as the shaft is rotated. The disk 412 can be moved axially on the shaft 31 so that the spacing between the disks 411 and 412 can be varied. A spring 414 is disposed around the annular guide member 412a between the second cone-shaped disk and the cap member 413 and urges the disk 412 towards the first cone-shaped disk 411.

The drilling member 54 is provided at a bottom side of the top housing 13. A support sleeve 51 is fixed to the housing 13 above the drilling member 54. A driven shaft 53 is held by the sleeve 51 by means of bearing assemblies 52. The bottom end of the driven shaft 53 is connected to the drilling member 54.

The variable-speed driven pulley assembly 42 includes a fixed cone-shaped disk 421 mounted on a shaft 53 which drives the drilling member 54. The cone-shaped face of the disk 421 is provided with a plurality of grooves 421a. A movable cone-shaped disk 422 is mounted movably on the shaft 53 adjacent the disk 421. The cone-shaped face of the disk 422 is also provided with a plurality of grooves 422a. The cone-shaped faces of the disks 421 and 422 are mated through the grooves 421a and 422a. The disk 422 can be moved axially so that the spacing between the disks 421 and 422 can be varied. The driving and driven pulley assemblies 41 and 42 are interconnected by a belt 43 so that the output rotation of the motor can be transmitted to the pulley assemblies 42. The disk 422 has a cylindrical hollow member 422c projecting from the side of the disk 422 opposite to the disk 421. An external screw thread 422e is provided on the hollow member 422c. An adjusting rod 423 has at one end thereof a bearing member 423a which is inserted in the cavity 422d of the cylindrical hollow member 422c. The periphery of the adjusting rod 423 is provided with a helical thread 423b.

A cylindrical cover body 424 is screwed to the cylindrical hollow member 422c to enclose the bearing member 423a and has a hole 424a to permit the threaded rod 423b to extend out of the hollow cylindrical member 422c.

A mounting member 425 is fixed to the housing 13 and is formed with a shaft hole 425a and an annular seat 425b aligned with the shaft hole 425a. An external screw thread 425c is provided on the annular seat 425b. Two balls 425f are received by two through-holes 425e in the annular seat 425b at two diametrically opposite positions. The annular seat 425b extends out of the top housing 13. The adjusting rod 423b passes through the hole of the annular seat 425b and extends out from the annular seat 425b. At the top end of the adjusting rod 423b is attached a knob 423c. A locking nut 426 is sleeved on the annular seat 425b and has an internal screw thread 426a to engage the screw thread 425c of the annular seat 425b. The locking nut 426 also has an annular groove 426c opening at its bottom end and an annular shoulder 426b between the screw thread 426a and the groove 426c. The annular shoulder 426b is slightly tapered from the annular groove 426c to the internal screw thread 426a. The annular groove 426c receives the balls 425f which project both inward & outward from the annular wall of the annular seat 425b. The balls 425f permit the adjusting rod to move although they engage the adjusting rod. However, when the locking nut 426 is turned to cause the slightly tapered annular shoulder 426b to abut the the balls 425f, the balls 425f are pushed slightly inward so that the balls tightly engage the helical thread of the adjusting rod. In this situation, the adjusting rod is prevented from rotating. An annular groove 425g of the annular seat 425b receives a C-shaped locking ring 425h which prevents the locking nut from being released from the annular seat 425b.

In operation, the motor 30 is energized after a workpiece (not shown) is positioned on the worktable 111. The output motion of the motor 30 is transmitted to the drilling member through the operation of the belt 43 and the pulley assemblies 41 and 42. While the drilling member is rotating, the handle 21 is turned counterclockwise to move the top housing 13 downward, thereby moving the drilling member to the workpiece. After completion of the drilling operation, the drilling member can be withdrawn from the workpiece by letting the top housing to move upward by the action of the spring 414. This action is done by releasing the handle 21.

The drilling machine of the present invention permits adjustment of the speed of the drilling member 54 during the drilling operation. The adjusting rod 423 does not rotate when the disks 421, 422 are rotated by the belt 43. However, when the knob 423c is turned for adjustment of the speed of the drilling member 54, the adjusting rod 423 rotates and moves axially inward or outward. The axial movement of the adjusting rod 423 pushes or pulls the movable disk 422 so that the pitch diameter of the disks 421 and 422 is adjusted. The pitch diameter of the disks 412 and 413 is also adjusted because of the tension of the belt 43, thereby changing the speed of the drilling member 54. During the adjusting operation of the adjusting rod 423, the locking nut 426 is loosened so that the balls 425f engage movably with the adjusting rod 423 and the adjusting rod 423 can be turned with the knob 423c. When the locking nut 426 is tightened by being moved inward, the balls 425f tightly engage the the tapered annular shoulder 426b and the helical thread of the adjusting rod 423, thereby preventing the rod 423 from rotation and also fixing the movable disk 422.

With the invention thus explained, it is apparent that various modifications and variations can be made without departing from the scope of the invention. It is therefore intended that the invention be limited only as indicated in the appended claims.

I claim:

1. A drilling machine including a vertical support holding a top housing and a worktable below the top housing, a drilling member mounted on said top housing and extending downward, a motor mounted on said top housing, said motor having a driving shaft, a driven shaft mounted to said top housing and connected to said drilling member, a transmission mechanism interconnecting said driving shaft and said driven shaft, means for feeding said drilling member, and improvements wherein:

said top housing is mounted movably on said vertical post to move upward or downward, said vertical post having a compression spring to urge said top housing upward, said feeding means including a rack member mounted on said vertical post, a horizontal operating shaft mounted in said top housing adjacent said rack member, a pinion mounted on said horizontal operating shaft and engaging said rack member, said pinion moving upward or downward when being rotated, an operating handle connected to said operating shaft so as to rotate said pinion, whereby said drilling member is fed when said top housing is moved downward by operating said handle.

2. A drilling machine including a vertical support holding a top housing and a worktable below the top housing, a drilling member mounted on said top housing and extending downward, a motor mounted on said top housing, said motor having a driving shaft, a driven shaft mounted to said top housing and connected to said drilling member, a transmission mechanism interconnecting said driving shaft and said driven shaft, means for feeding said drilling member, and improvements wherein:

said top housing is mounted movably on said vertical post to move upward or downward, said vertical post having a compression spring to urge said top housing upward, said feeding means including a rack member mounted on said vertical post, a horizontal operating shaft mounted in said top housing adjacent said rack member, a pinion mounted on said horizontal operating shaft and engaging said rack member, said pinion moving upward or downward when being rotated, an operating handle connected to said operating shaft so as to rotate said pinion, whereby said drilling member is fed when said top housing is moved downward by operating said handle; and said vertical post is hollow and encases a fixed vertical guide rod, said top housing having a hollow to receive a top portion of said vertical post, said top housing further having a bearing part above said vertical post, said bearing part having an opening to permit said vertical fixed guide rod to pass therethrough, said compression spring disposed in said vertical post around said vertical rod, said compression spring having a bottom end fixed to said vertical post and a top end connected to said bearing part.

3. A drilling machine including a vertical support holding a top housing and a worktable below the top housing, a drilling member mounted on said top housing and extending downward, a motor mounted on said top housing, said motor having a driving shaft, a driven shaft mounted to said top housing and connected to said drilling member, a transmission mechanism interconnecting said driving shaft and said driven shaft, means for feeding said drilling member, and improvements wherein:

said top housing is mounted movably on said vertical post to move upward or downward, said vertical post having a compression spring to urge said top housing upward, said feeding means including a rack member mounted on said vertical post, a horizontal operating shaft mounted in said top housing adjacent said rack member, a pinion mounted on said horizontal operating shaft and engaging said rack member, said pinion moving upward or downward when being rotated, an operating handle connected to said operating shaft so as to rotate said pinion, whereby said drilling member is fed when said top housing is moved downward by operating said handle; and said transmission mechanism comprises:

a variable speed driving pulley assembly having a first fixed cone-shaped disk and a first movable cone-shaped disk mounted on said driving shaft, a variable speed driven pulley assembly having a second fixed cone-shaped disk and a second movable cone-shaped disk mounted on said driven shaft, a belt interconnecting said driving and driven pulley assemblies, an adjustable rod mounted rotatably in said top housing and aligned coaxially with said driven shaft, said adjusting rod having a first end rotatably connected to a center portion of said second movable cone-shaped disk, a second end extending out of said top housing and a peripheral helical thread between said first and second end, a knob attached to said second end of said adjusting rod, an annular seat mounted on and extending out from said top housing, said annular seat having a through-hole to be permit said adjusting rod to pass therethrough and a projection means engaging said peripheral helical thread so that said adjusting rod moves axially when being rotated, and means for preventing said adjusting rod from rotation, provided adjacent said knob.

4. A drilling machine as claimed in claim 3, wherein said annular seat has an annular wall, two through-holes provided in said annular wall at diametrically opposite positions, said projection means having two balls movably received in said through-holes and projecting inward and outward of said annular wall.

5. A drilling machine as claimed in claim 4, wherein said annular seat further has an external screw thread on said annular wall, said preventing means to include a locking nut disposed around said annular seat, said locking nut having a third end adjacent to said knob, a fourth end opposite to said third end, an internal screw thread adjacent to said third end and engaging said external screw thread of said annular wall, an annular groove which is opened at said fourth end receives portions of said balls projecting from said annular wall, and an annular shoulder formed between said internal screw thread and said annular groove, said annular shoulder being slightly tapered from said annular groove to said internal screw thread, said balls tightly engaging said annular shoulder and said helical thread and prevent said adjusting rod from rotation when said locking nut is tightened.

* * * * *